(12) United States Patent
Fleck et al.

(10) Patent No.: US 7,292,376 B2
(45) Date of Patent: Nov. 6, 2007

(54) DEVICE FOR DIGITALLY GENERATING IMAGES

(75) Inventors: Adolf Fleck, Unterhaching (DE); Ekkehard Gross, Frostinning (DE); Ulrich Klueter, Munich (DE); Rainer Regber, Kochel/Ried (DE)

(73) Assignee: Agfa-Geveart Aktiengesellschaft, Leverkusen (DE)

( * ) Notice: Subject to any disclaimer, the term of this patent is extended or adjusted under 35 U.S.C. 154(b) by 860 days.

(21) Appl. No.: 10/312,293

(22) PCT Filed: Jun. 27, 2001

(86) PCT No.: PCT/EP01/07349

§ 371 (c)(1),
(2), (4) Date: Dec. 20, 2002

(87) PCT Pub. No.: WO02/02342

PCT Pub. Date: Jan. 10, 2002

(65) Prior Publication Data

US 2003/0090733 A1 May 15, 2003

(30) Foreign Application Priority Data

Jul. 5, 2000 (DE) ................................. 100 31 856

(51) Int. Cl.
*H04N 1/036* (2006.01)
*B41J 2/245* (2006.01)
*B41J 2/47* (2006.01)

(52) U.S. Cl. ...................... 358/302; 347/232; 347/255; 347/257; 347/258; 347/263

(58) Field of Classification Search ................ 358/302, 358/401; 347/255–258, 263, 232, 239, 241–242, 347/244–245, 134–138, 129
See application file for complete search history.

(56) References Cited

U.S. PATENT DOCUMENTS

| 5,029,313 A | 7/1991 | Robison et al. |
| 5,191,358 A | 3/1993 | Iwasaki |
| 5,447,827 A | 9/1995 | Ishikawa et al. |
| 6,222,612 B1 * | 4/2001 | Kluter et al. .................. 355/40 |

FOREIGN PATENT DOCUMENTS

| DE | 196 44 587 | 4/1997 |
| DE | 196 23 835 | 1/1998 |
| DE | 198 02 621 | 8/1998 |
| GB | 2017590 | 10/1979 |
| JP | 4--60610 | 2/1992 |
| JP | 5-306951 | 12/1993 |
| JP | 7-36121 | 2/1995 |

* cited by examiner

*Primary Examiner*—Scott A. Rogers
(74) *Attorney, Agent, or Firm*—Milde & Hoffberg, LLP

(57) ABSTRACT

The invention relates to a device for digitally generating images on photosensitive material comprising a light source, a liquid crystal display (LCD) unit and imaging optics. According to the invention, the LCD unit and the imaging optics are mounted in the same lens tube.

6 Claims, 2 Drawing Sheets

DEVICE FOR DIGITALLY GENERATING IMAGES

BACKGROUND OF THE INVENTION

The present invention relates to a device for digitally generating multi-color images onto photographic paper, such device having a light source, a liquid crystal display (LCD) and reproduction optics.

Conventional photography on the basis of silver halide film is increasingly supplemented by electronic components both on the recording side, e.g., cameras, and in the course of the subsequent processing of the film. For example, modern cameras may record additional information relating to the image such as the recording date, a greeting text or other information on the film. In this context, films have been known now for some time that carry a magnetic recording layer, where information from the camera can be provided to the film for subsequent film processing steps. Such a film and the corresponding processing procedure are disclosed, for example, in the U.S. Pat. No. 5,029,313.

Furthermore, it is often desired to print additional information such as greeting texts during the subsequent processing procedure, i.e., after the photographic development of the film, on or next to the photographic prints generated from said film. Increasingly it is also desired to output images in photographic quality onto photographic material directly from an electronic image source, e.g., from an electronic memory as is used in digital cameras, a computer or a scanner.

Increasingly, so-called index prints are generated in photo finishing processes. The U.S. Pat. No. 5,447,827 presents such a process. In this process, all images of a photographic film are scanned opto-electronically and compiled electronically to an image that contains all individual images of the film. The individual images are supplemented with corresponding information such as film number, image number, recording date, motif text, etc., and this image is then output as an index print. Photographic photo finishing methods distinguish between so-called offline index print systems and inline index print systems.

In a so-called offline index print system, the index images are separated from the remaining photo prints and output using a separate printer and subsequently assigned to the remaining images. In an inline index print system, on the other hand, the index prints are generated together with the individual prints of the individual images of the photographic film in one and the same device. This device then is capable of outputting both conventional images optically onto copy material and electronic image signals onto the same copy material. The main advantage of the inline index print system is that the order of the index prints generated already matches up with the images of the photos ordered, thus no longer requiring the extra effort of sorting.

SUMMARY OF THE INVENTION

It is a principal objective of the present invention to provide a method and a device where electronic image signals can be output in high—i.e., photographic—quality onto light-sensitive recording medium, whereby the required means are to be as simple as possible and where the arrangement is suitable for an inline index print system. In addition, the device should be designed such that a conventional photographic copier can be easily retrofitted with said device.

This objective, as well as other objectives which will become apparent from the discussion that follows, are achieved, according to the present invention, by installing the LCD unit and the reproduction optics in the same lens barrel. Due to the fixed assignment between the LCD unit —that is, the image-generating component—and the reproduction optics, a depth of focus of the image can be achieved such that tolerances in the paper guiding system or in positioning the device in the beam path are without negative influences on the image quality.

The preferred type of reproduction optics is a fixed focal length optics because in this case the distance between LCD unit and reproduction optics can be adjusted accurately at the plant. However, similar advantages are achieved with a zoom optics, where the distance between the LCD unit and the reproduction optics, although not constant, is not dependent on the assembly of the device in the copier because a very accurate assignment is provided between LCD (objective plane) and reproduction optics through the adjustment in the same lens barrel.

The control electronics of the LCD unit is preferably also included in the lens barrel. In this manner, the calibration of the device, e.g., with respect to edge drop, can already be performed at the factory, and the corresponding correction values can be stored in the control electronics. An additional calibration after the installation of the device in a photographic copier is then no longer necessary.

A telecentric reproduction optic is provided to ensure a sharp reproduction of the image generated with the LCD unit. However, since this optics only allows the parallel beams near the axis to pass through, a condenser is additionally provided in the lens barrel. Such a condenser parallelizes the light emitted by the light source so that essentially only parallel light passes through the LCD unit, while still achieving a high light yield.

The invention is particularly suitable for retrofitting photographic projection copiers for providing electronic image signals of pointwise assembled images. This requires, in addition to the lens barrel with its integrated components, only an adjustment of the electronic control means of the projection copier. In order to switch a copier between a conventional projection mode, where a conventional film original is copied onto a light-sensitive recording material (in particular, a color negative film original onto a color negative recording paper), and a fully electronic mode, where electronic image signals are output onto the color negative paper, it is planned, in particular, that the lens barrel for outputting the electronic image be inserted, or more specifically slid, into the beam path. For this purpose, the lens barrel with the LCD unit and the reproduction objective for the exposure of the transparent original are attached to a common slide that is moved into a position corresponding to the selected mode.

With such a design, a white light source of the conventional projection copier together with the respective color filter unit can be used for both generating a conventional copy and as a light source for the unit for generating the electronic image to output the electronic image signals onto light-sensitive recording material.

For a full understanding of the present invention, reference should now be made to the following detailed description of the preferred embodiments of the invention as illustrated in the accompanying drawings.

BRIEF DESCRIPTION OF THE DRAWINGS

The preferred embodiments of the present invention will now be described with reference to FIGS. 1 and 2 of the drawings. Identical elements in the various figures are designated with the same reference numerals.

DESCRIPTION OF THE PREFERRED EMBODIMENT

Figure 1:
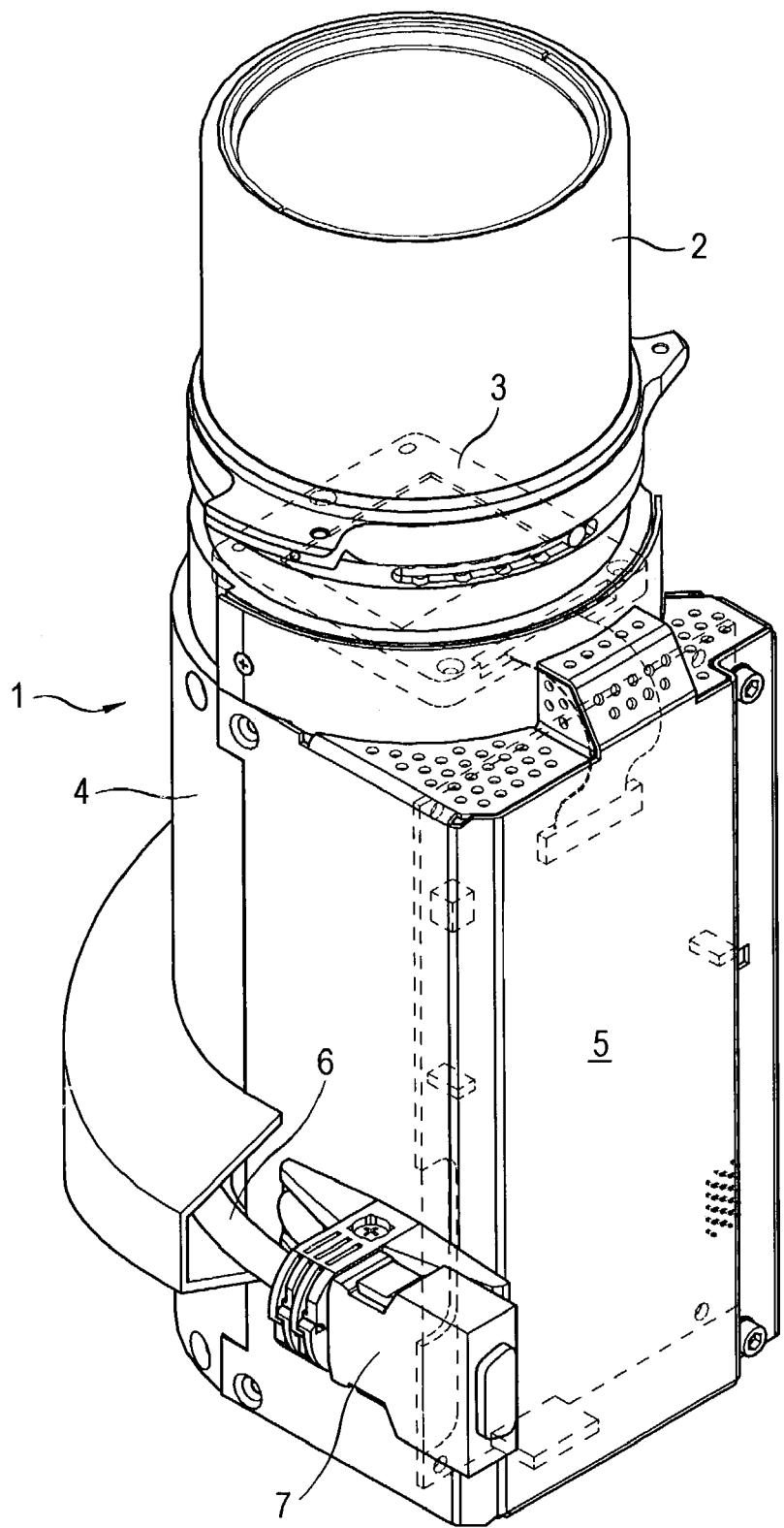
FIG. 1 shows a device according to the invention with an LCD unit and a reproduction objective in the same lens barrel.

The lens barrel 1 shown in FIG. 1 contains a condenser 2 for combining and parallelizing the light, an LCD unit 3 for generating the image and a reproduction optics 4 that is used to expose the image generated by the LCD unit sharply onto light-sensitive paper. The LCD unit consists of the actual LCD and a control electronics 5. The control electronics is connected to a connector 7 via the cable 6. Digital image data pass from the photographic copier to the control electronics via said connector 7.

The reproduction optics is designed as a telecentric objective such that only parallel light is reproduced. In this manner, a sharp and distortion-free reproduction of the image generated by the LCD is possible.

The condenser 2 is provided to capture sufficient light for essentially short exposure times. The condenser collects the light emitted by the light source, which is not shown in FIG. 1; it parallelizes the light such that only parallel light passes through the LCD.

A memory, which is not shown in the drawing and which is part of the control electronics 5, is where calibration data can be stored. In this manner, the calibration values, e.g., for the edge drop, can already be obtained and stored in the memory during the adjustment at the factory. These values are then available at any time for generating the digital images in the photographic copier.

Figure 2:
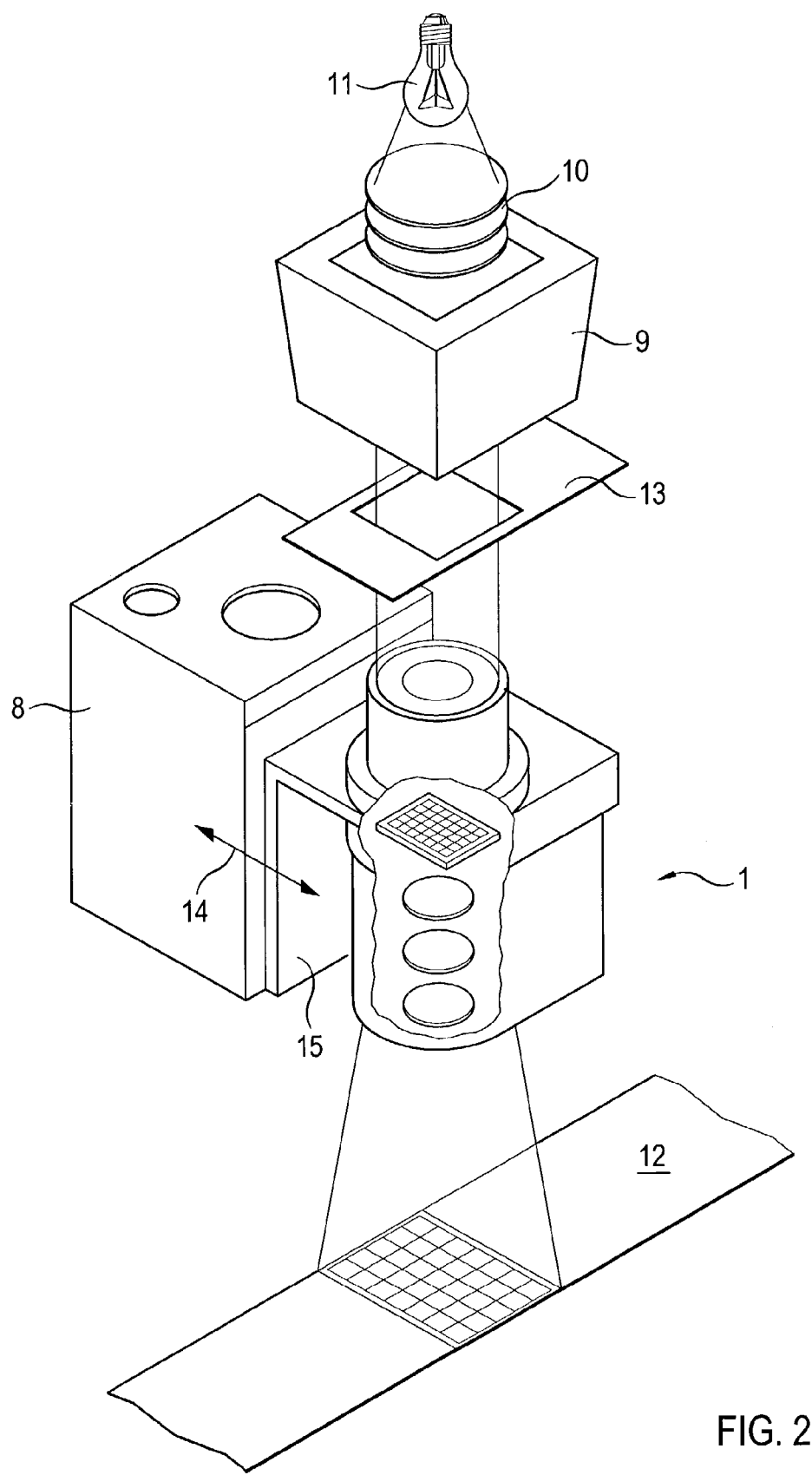
FIG. 2 shows a photographic copier according to the invention.

The photographic copier in FIG. 2 is suitable for generating paper pictures from both transparent films and from digital images.

The light emitted by the light source 11 is influenced in accordance with the correction values determined by the filter unit 10 and provided to the light mixture duct. The film stage, where the original films are positioned and secured in their position during the exposure process is provided underneath the light mixture duct.

A reproductive (zoom) objective 8 and the lens barrel 1 with the LCD unit 3 (FIG. 1) and the reproduction optics 4 are mounted on a support 15 that travels in the direction of the double arrow.

The light-sensitive material 12 is positioned on a paper stage (not shown).

When processing conventional film, the support 15 is moved such that the zoom objective is located in the beam path. The film will be positioned image by image on the film stage 13 once the film to be processed has been scanned and the individual color values have been determined. This is followed by three exposures in the colors blue green and red. This procedure is repeated until all copy-able images of the film have been exposed onto the photographic paper.

To generate the index print, the film is transported out of the film stage and the support 15 is moved such that the lens barrel 1 is located in the beam path. The film stage need not be moved out of the beam path such that no additional manual activities are required.

The unit is supplied with the digital image data and the LCD is controlled accordingly via the connector 7 (FIG. 1). Now in succession, 3 color extracts are exposed onto the photographic paper based on the control of the filter unit 10. Thereafter, the support 15 can again travel to the position where the zoom objective is located in the beam path and the copier is ready to process the next film.

Of course, not only index prints can be generated with the device subject to the invention but it is also suitable for generating all kinds of digital images. For example, data from digital cameras or from photo CDs may be exposed onto light-sensitive material. In addition, the device according to the invention is also suitable for generating greeting cards, calendar sheets or other pictures that are to be provided with additional text.

There has thus been shown and described a novel device for digitally generating images which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A device for exposing multi-color images onto light-sensitive material, said images being selected from a transparent original and a liquid crystal display (LCD), said device comprising:
    (a) a light source;
    (b) a first stage for supporting the transparent original in a beam path of the light source;
    (c) a second stage for supporting the light-sensitive material arranged in alignment with the first stage so as to receive light in the beam path of the light source;
    (d) a reproduction objective for exposing a transparent original disposed on the first stage onto the light-sensitive material disposed on the second stage;
    (e) a lens barrel in which are mounted an LCD and a reproduction optics, for exposing a digitally generated image from the LCD onto the light-sensitive material disposed on the second stage; and
    (f) a moveable slide on which are mounted the reproduction objective and the lens barrel, said slide being operative to selectively move one of the reproduction objective and the lens barrel into alignment with the beam path;
    whereby either the transparent original may be exposed on the light-sensitive material through the reproduction objective or the digitally generated image may be exposed on the light-sensitive material through the reproduction optics.

2. A device as set forth in claim 1, wherein the LCD includes a control electronics.

3. A device as set forth in claim 2, wherein calibration values are stored in the control electronics.

4. A device as set forth in claim 1, further comprising a light condenser in the lens barrel.

5. A device as set forth in claim 1, wherein a fixed distance is set between LCD and the reproduction optics in the lens barrel.

6. A device as set forth in claim 1, wherein the reproduction optics is designed as a telecentric objective.

* * * * *